United States Patent
Sevastiyanov et al.

(10) Patent No.: US 9,224,235 B2
(45) Date of Patent: Dec. 29, 2015

(54) SYSTEM, METHOD, AND COMPUTER PROGRAM PRODUCT FOR COMPRESSION OF A BOUNDING VOLUME HIERARCHY

(71) Applicant: NVIDIA Corporation, Santa Clara, CA (US)

(72) Inventors: Igor Sevastiyanov, San Jose, CA (US); Barbara Wolfers, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 294 days.

(21) Appl. No.: 13/848,011

(22) Filed: Mar. 20, 2013

(65) Prior Publication Data

US 2014/0285488 A1  Sep. 25, 2014

(51) Int. Cl.
G06T 15/06 (2011.01)
G06T 9/00 (2006.01)
G06T 17/00 (2006.01)
G06T 9/40 (2006.01)

(52) U.S. Cl.
CPC .............. *G06T 15/06* (2013.01); *G06T 9/001* (2013.01); *G06T 9/40* (2013.01); *G06T 17/005* (2013.01); *G06T 2210/12* (2013.01)

(58) Field of Classification Search
None
See application file for complete search history.

(56) References Cited

U.S. PATENT DOCUMENTS

2010/0286972 A1* 11/2010 Callegari .................. 703/10
2011/0080403 A1*  4/2011 Ernst et al. ............... 345/420
2014/0169480 A1*  6/2014 Lachine et al. ........ 375/240.23

OTHER PUBLICATIONS

Kim, Tae-Joon, et al. "RACBVHs: Random-accessible compressed bounding volume hierarchies." Visualization and Computer Graphics, IEEE Transactions on 16.2 (2010): 273-286.*
Sundar, Hari, Rahul S. Sampath, and George Biros. "Bottom-up construction and 2:1 balance refinement of linear octrees in parallel." SIAM Journal on Scientific Computing 30.5 (2008): 2675-2708.*

* cited by examiner

*Primary Examiner* — Phi Hoang
*Assistant Examiner* — Diane Wills
(74) *Attorney, Agent, or Firm* — Zilka-Kotab, PC

(57) ABSTRACT

A system, method, and computer program product for compressing a bounding volume hierarchy is disclosed. The method includes the steps of receiving a bounding volume hierarchy and encoding the bounding volume hierarchy to generate an encoded bounding volume hierarchy, wherein each node in the encoded bounding volume hierarchy indicates whether the node inherits zero or more values from a parent node. The bounding volume hierarchy includes a plurality of nodes, each node in the plurality of nodes is associated with a bounding volume.

9 Claims, 10 Drawing Sheets

SYSTEM, METHOD, AND COMPUTER PROGRAM PRODUCT FOR COMPRESSION OF A BOUNDING VOLUME HIERARCHY

FIELD OF THE INVENTION

The present invention relates to computer rendering, and more particularly to the representation of computer models in a bounding volume hierarchy.

BACKGROUND

Some computer graphics rendering algorithms, particularly ray-tracing algorithms, utilize bounding volumes to make certain calculations more efficient. For example, instead of intersecting a ray with a triangle, the ray may be intersected with a cube or sphere that bounds the triangle. The calculations for intersecting the ray with the cube or sphere shaped bounding volume may be much simpler to perform than the calculations for intersecting the ray with the triangle. In order to easily access the objects in a 3D model, bounding volumes may be organized in abounding volume hierarchy. The bounding volume hierarchy commonly takes the form of a binary tree or a quad tree. The leaf nodes of the tree store objects (e.g., triangles) in the model, or bounding volumes associated with a single object, and the parent node of two or more leaf nodes store bounding volumes that enclose each of the objects in the leaf nodes. The root node stores a bounding volume that encloses every object represented by the bounding volume hierarchy.

The bounding volume hierarchy may become quite large for complex models used in computer rendering algorithms. The models may contain hundreds of thousands or millions of individual graphics objects (i.e., triangles). In addition to the data required to store each of the objects, the bounding volume hierarchy must also store coordinates that represent the dimensions of the bounding volumes within the hierarchy. Commonly, an uncompressed bounding volume hierarchy may be hundreds of megabytes (MB) or gigabytes (GB) in size. These bounding volume hierarchies are typically utilized by graphics processing units that include a dedicated local memory (i.e., Random Access Memory or RAM). Local RAM sizes may only be 512 MB or 1 GB, thereby limiting the size of bounding volume hierarchies that may be stored entirely on the local memory without implementing a backing store associated with long latencies for reading and writing. Long latency access to a backing store reduces the efficiency of the computer rendering algorithm thereby increasing the time it takes to render a scene. However, reducing the size of the bounding volume hierarchy by limiting the number of objects in a model may reduce the quality of the rendering generated because the model is of lower resolution. Thus, there is a need for more efficient compression of bounding volume hierarchies that addresses this issue and/or other issues associated with the prior art.

SUMMARY

A system, method, and computer program product for compressing a bounding volume hierarchy is disclosed. The method includes the steps of receiving a bounding volume hierarchy and encoding the bounding volume hierarchy to generate an encoded bounding volume hierarchy, wherein each node in the encoded bounding volume hierarchy indicates whether the node inherits zero or more values from a parent node. The bounding volume hierarchy includes a plurality of nodes, each node in the plurality of nodes is associated with a bounding volume.

DETAILED DESCRIPTION

Figure 1:
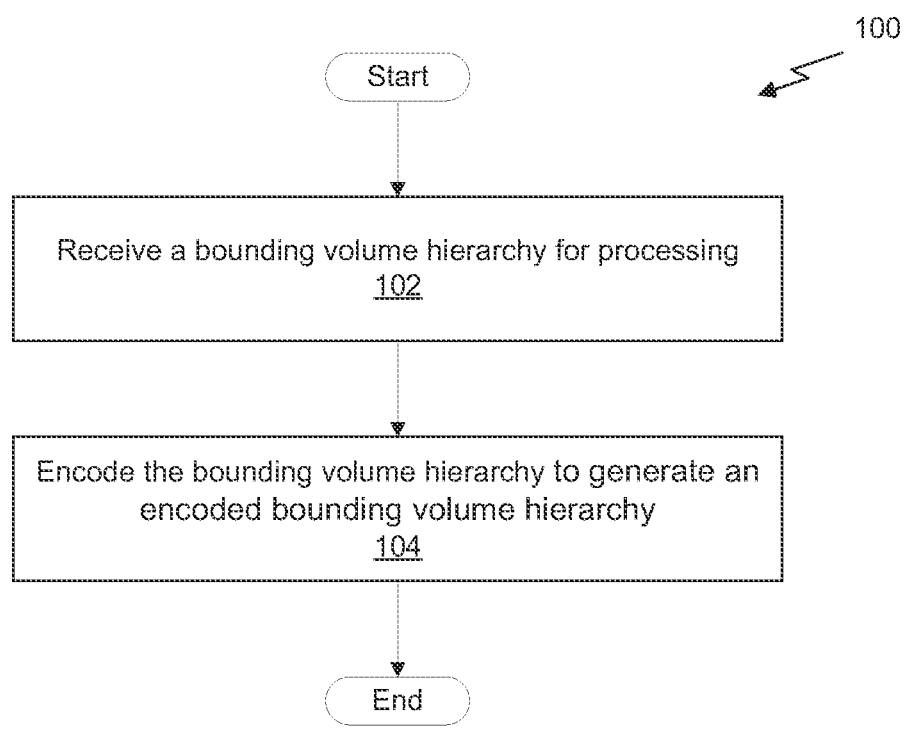
FIG. 1 illustrates a flowchart of a method for compressing a bounding volume hierarchy, in accordance with one embodiment.

FIG. 1 illustrates a flowchart 100 of a method for compressing a bounding volume hierarchy, in accordance with one embodiment. At step 102, a bounding volume hierarchy is received for processing. The bounding volume hierarchy includes a plurality of nodes, each node in the plurality of nodes is associated with a bounding volume. At step 104, the hounding volume hierarchy is compressed to generate an encoded bounding volume hierarchy. In one embodiment, each node within the encoded bounding volume hierarchy indicates whether the node inherits zero or more values from a parent node.

It should be noted that, while various optional features are set forth herein in connection with compressing bounding volume hierarchies, such features are for illustrative purposes only and should not be construed as limiting in any manner. In one embodiment, the method described above is implemented by a parallel processing unit.

Figure 2:
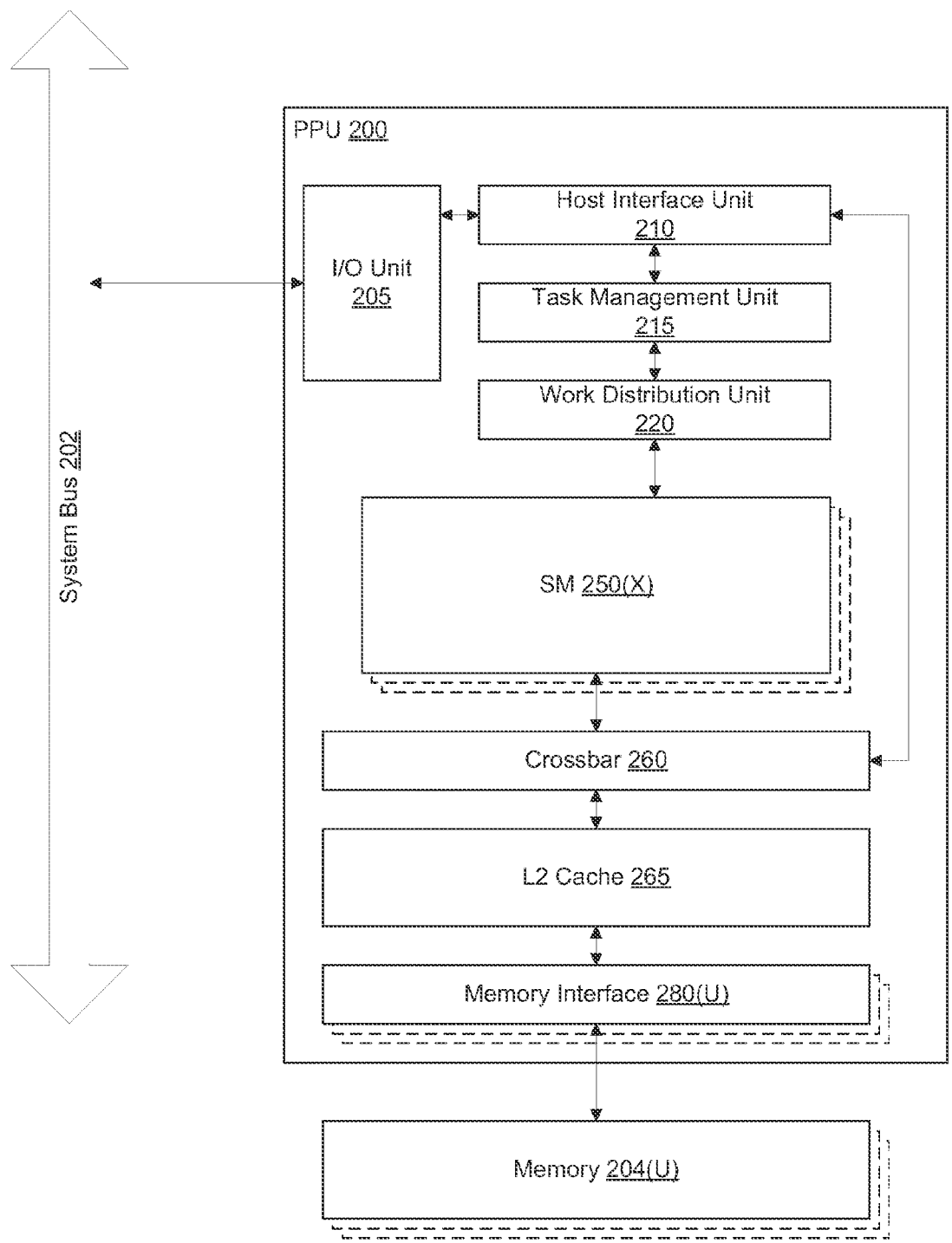
FIG. 2 illustrates a parallel processing unit, according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250 (X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e. Northbridge) of the motherboard.

Figure 3:
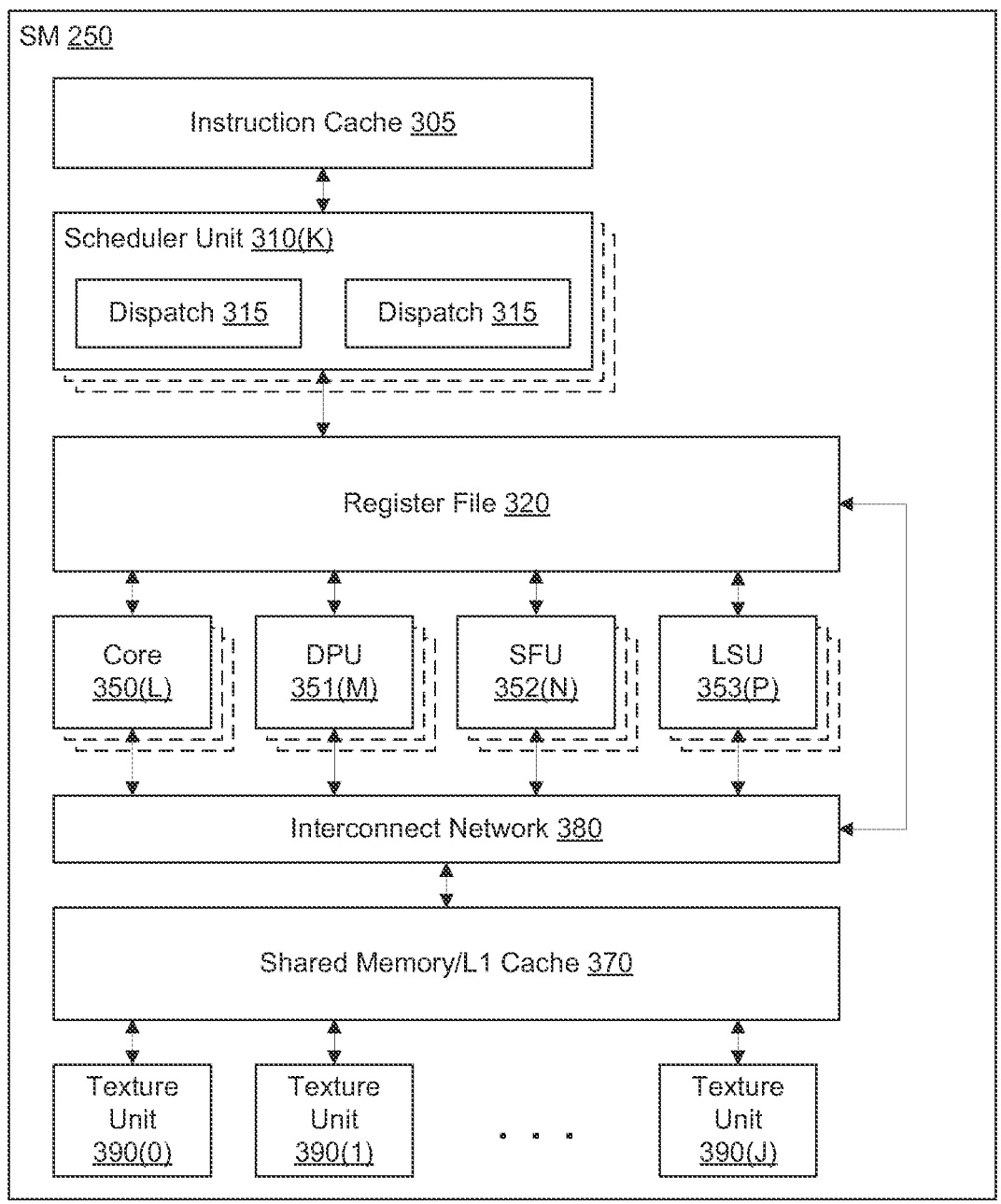
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes an interconnect network 380 that connects each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-aliasing operations using nip-maps (i.e., texture maps of varying levels of detail). In one embodiment, the SM 250 includes 16 texture units 390.

The PPU 200 described above may be configured to perform highly parallel computations much faster than conventional CPUs. Parallel computing has advantages in graphics processing, data compression, biometrics, stream processing algorithms, and the like.

Bounding Volume Hierarchy

Figure 4A:
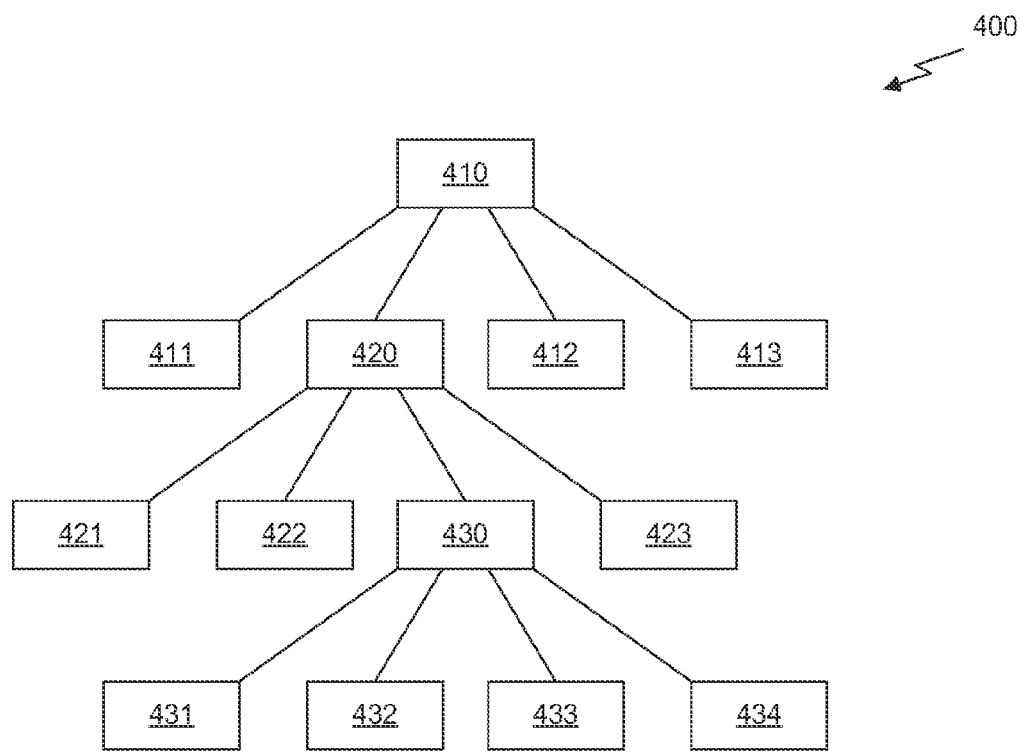
FIG. 4A illustrates a bounding volume hierarchy, in accordance with one embodiment.

FIG. 4A illustrates a bounding volume hierarchy (BVH) 400, in accordance with one embodiment. The BVH 400 is a data structure that represents a plurality of bounding volumes arranged in a hierarchical manner. In one embodiment, the Mill 400 is a quad tree that includes a root node 410 as well as a plurality of nodes arranged on levels below the root node 410. Each node in the BVH 400 references four child nodes. For example, the root node 410 references a first child node 411, a second child node 420, a third child node 412, and a fourth child node 413. Similarly, the second child node 420 references a first child node 421, a second child node 422, a third child node 430, and a fourth child node 423. The base level (i.e. level zero) of the BVH 400 includes the root node 410, the first level of the BVH 400 includes the first child node 411, the second child node 420, the third child node 412, and the fourth child node 413, and the second level of the BVH 400 includes the first child node 421, the second child node 422, the third child node 430, and the fourth child node 423, and so forth. Although not shown explicitly, the first child node 411, the third child node 412, and the fourth child node 413 in the first level of the BVH 400 may also reference one or more additional child nodes, each child node may in turn reference one or more additional child nodes, and so forth. In alternative embodiments, the BVH 400 may be implemented as a binary tree, an octree, an N-ary tree, or any other data structure capable of representing a hierarchy of nodes.

The BVH 400 includes leaf nodes (e.g., nodes 431, 432, 433, and 434) that represent a single object. In one embodiment, the leaf nodes include a pointer to a graphics object such as a primitive (e.g., a triangle) that is included in the model represented by the BVH 400. In another embodiment, the leaf nodes include data that represents a bounding volume that bounds a single graphics object and a link or pointer to the graphics object that is stored in a separate location in memory. In yet another embodiment, the leaf nodes include a graphics object (i.e., rather than a pointer to the graphics object, the node stores the graphics object itself). Each parent node (e.g., node 430) represents abounding volume that encloses every object represented by the parent node's child nodes. As shown in FIG. 4A, the parent node 430 represents a bounding volume that encloses the graphics objects represented by child nodes 431, 432, 433, and 434.

In one embodiment, a bounding volume comprises an axis-aligned rectilinear volume that completely encloses one or more graphics objects in the model space. For example, a model may be defined as a set of triangles in a three-dimensional (3D) space. The 3D space is associated with a coordinate system having three orthogonal axes (i.e., an x-axis, a y-axis, and a z-axis). Bounding volumes are defined by the enclosed volume within six bounding planes perpendicular to one of the axes of the coordinate system. In other words, a bounding volume is enclosed by the planes given by the equations $x=x_{min}$, $x=x_{max}$, $y=y_{min}$, $y=y_{max}$, $z=z_{min}$, and $z=z_{max}$.

Figure 4B:
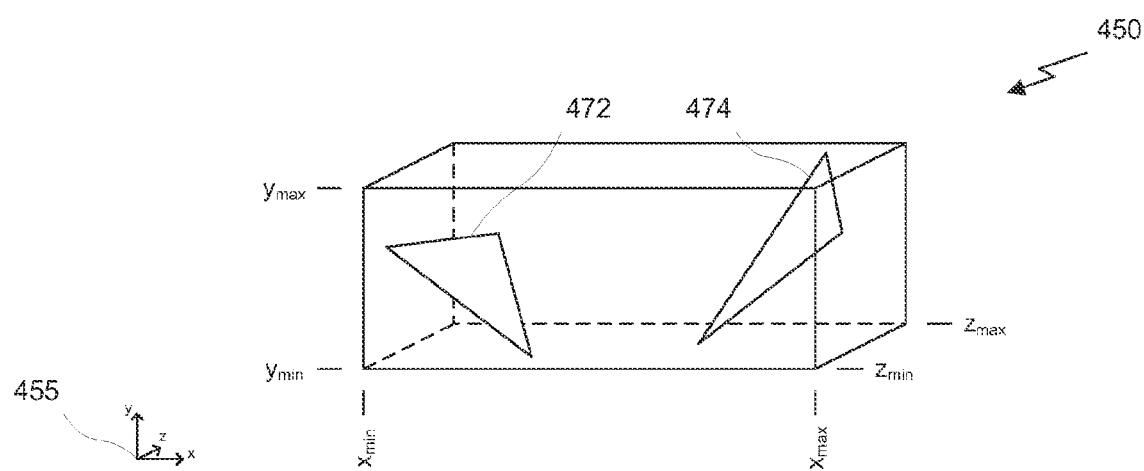
FIG. 4B illustrates an axis-aligned rectilinear bounding volume, in accordance with one embodiment.

FIG. 4B illustrates an axis-aligned rectilinear bounding volume 450, in accordance with one embodiment. As shown in FIG. 4B, the bounding volume 450 encloses two graphics objects, i.e., a triangle 472 and a triangle 474. The bounding volume is defined by reference to the model space having an origin 455 corresponding with $x=0$, $y=0$, and $z=0$. The model space may be bounded by a minimum x-coordinate and maximum x-coordinate as well as a minimum and a maximum y-coordinate and a minimum and a maximum z-coordinate for all of the graphics objects in the model. Within the BVH 400 data structure, the bounding volume 450 is represented by the values for $x_{min}$, $x_{max}$, $y_{min}$, $y_{max}$, $z_{min}$, and $z_{max}$ that represent the six planes that form the enclosed bounding volume. The bounding volume may be stored in the data structure as six floating point values (e.g., IEEE 754 32-bit single-precision floating-point values), where each value represents one of the values for $x_{min}$, $x_{max}$, $y_{min}$, $y_{max}$, $z_{min}$, and $z_{max}$.

The size of the BVH 400 can be quite large. As described, each node includes at least 24 bytes of floating point values (i.e., 6 single-precision floating-point values) to describe the bounding volume associated with the node. A typical BVH 400 may represent hundreds of thousands or millions of graphics objects. Assuming that the leaf nodes include at least 24 bytes of data for a bounding volume that encloses the graphics object associated with the leaf node, a BVH 400 for a model having 5,000,000 graphics objects has at least 120 MB of data just in specifying bounding volumes associated with the leaf nodes. In addition, each parent node for every four leaf nodes (in the case of a quad tree implementation) has an additional bounding volume defined by six additional coordinates. Those parent nodes have additional parent nodes that include more bounding volumes and so forth. In addition to the data for storing bounding volume information, the BVH 400 may also include data for the graphics object (e.g., a pointer to the graphics object in a separate data structure or the data the represents the graphics object) as well as pointers and other information related to the hierarchical structure of the BVH 400. Thus, the BVH 400 may become quite large, sometimes surpassing the available local memory 204 of a PPU 200 configured to render a scene.

In another embodiment, each node includes the coordinates for the bounding volumes associated with each child node associated with the node. For example, in a binary-tree implementation of the BVH 400, a root node may include six values associated with a first bounding volume for a left child node and six values associated with a second bounding volume for a right child node. Then, each child node may include six values for a left grand-child node and six values for a right grand-child node, where a grand-child node is a child node of a child node. Although the format of each node is different than the format described above, the structure of the hierarchy is the same; i.e., each node is associated with a bounding volume that encloses each of the bounding volumes associated with a child node. The only difference is that the root node in this embodiment does not include one bounding volume that encloses every graphics object, but includes two separate bounding volumes that enclose all of the graphics objects associated with a left child node and all of the graphics objects associated with a right child node, respectively.

Each bounding volume may share one or more planes of the bounding volume with a bounding volume associated with a child node. In other words, a bounding volume that encloses four other bounding volumes may share each of the six planes that comprise the bounding volume with one or more planes of one or more of the child nodes, assuming that the bounding volume is a minimum bounding volume. Some of the child nodes may not share any planes with the bounding volume of the parent node. Other child nodes may share one plane (e.g., $x=x_{min}$) with the bounding volume of the parent node. Yet other child nodes may share two or three planes with the bounding volume of the parent node. FIGS. 5A through 5D provide examples that show different cases where child nodes share zero or more planes with the bounding volume of a parent node using a two-dimensional (2D) example.

Figure 5A:
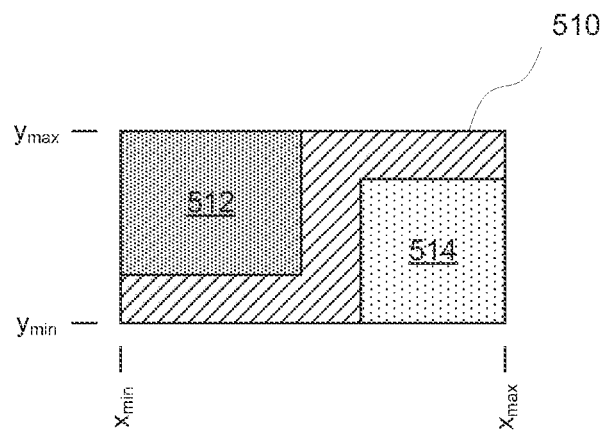
FIGS. 5A through 5D illustrate a two-dimensional bounding box that encloses two graphics objects, in accordance with one embodiment.

FIGS. 5A through 5D illustrate a 2D bounding box that encloses two graphics objects, in accordance with one embodiment. As shown in FIG. 5A, the bounding box 510 encloses a bounding box 512 enclosing a first graphics object and a bounding box 514 enclosing a second graphics object. It will be appreciated that the bounding boxes 512 and 514 share one or more surfaces with the bounding box 510. For example, as shown in FIG. 5A, the bounding box 512 shares a first surface ($y=y_{max}$) with the bounding box 510. The bounding box 512 also shares a second surface ($x=x_{min}$) with the bounding box 510. Similarly, the bounding box 514 shares a first surface ($y=y_{min}$) and a second surface ($x=x_{max}$) with the bounding box 510. It will be appreciated that the values defining planes of the bounding volume in a parent node may be shared with the bounding volumes associated with one or more of the child nodes. In the case where bounding volumes are minimum bounding volumes (i.e., meaning that the planes that form the enclosed volume tightly surround the one or more graphics objects enclosed by the bounding volume), then every plane of the bounding volume in the parent node is a plane of at least one bounding volume in a child node.

Figure 5B:
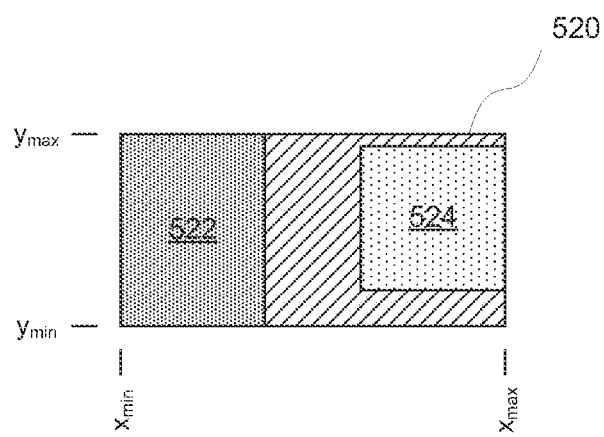

As shown in FIG. 5B, the bounding box 520 shares a top surface ($y=y_{max}$), a bottom surface ($y=y_{min}$), and a left surface ($x=x_{min}$) with the bounding box 522. The bounding box 520 also shares a right surface ($x=x_{max}$) with the bounding box 524. As FIG. 5B makes clear, the parent node (i.e., the node associated with bounding box 520) can inherit values for the surfaces of the bounding box 520 from the child nodes associated with the bounding boxes 522 and 524. Three values can be inherited from the child node associated with bounding box 522 and one value can be inherited from the child node associated with bounding box 524. Conversely, the parent node may store each of the values for the bounding box 520 and the child nodes may inherit values from the parent node. For example, the child node associated with bounding box 522 may inherit three values from the parent node and the child node associated with bounding box 524 may inherit one value from the parent node.

Figure 5C:
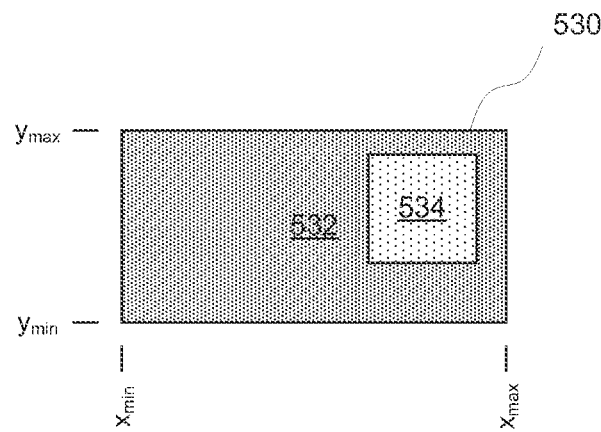

As shown in FIG. 5C, the bounding box 530 shares all four surfaces with a bounding box 532. Note that the bounding box 530 is not explicitly shown in FIG. 5C because bounding box 532 completely obscures the representation of bounding box 530 in FIG. 5C. It will be appreciated that the bounding box 532 completely encloses the bounding box 534. Cases where the bounding box of one child node associated with a parent node completely enclose a bounding box of another child node associated with the parent node are uncommon and are typically avoided by properly balancing the BVH 400 such that the bounding box 534 is not on the same level of the BVH 400 as the bounding box 532.

Figure 5D:
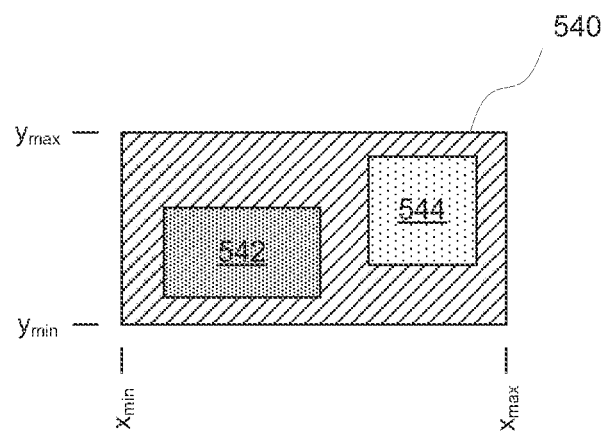

As shown in FIG. 5D, the bounding box 540 does not share any surfaces with the bounding box 542 or the bounding box 544. The bounding box 540 may not be implemented as a minimum bounding box and, therefore, the surfaces of the bounding box 540 may be beyond the extents of the surfaces of either of the bounding boxes 542 and 544. Although not shown explicitly, a child may also inherit no values from the bounding box of a parent node (even when minimum bounding boxes are implemented) when more than two child nodes are included within a parent node. In such cases (e.g., when the BVH 400 implements a quad tree or an octree), one or more of the child nodes may be positioned such that two or more other child nodes share surfaces of the bounding box for the parent node, which completely enclose the one or more child nodes without sharing any surfaces with the bounding box for the parent node.

FIGS. 5A through 5D provide examples of different cases where bounding boxes inherit zero or more values from a parent node in a 2D model space. For example, in FIG. 5B, bounding box 524 inherits one value from bounding box 520. In FIG. 5A, bounding boxes 512 and 514 each inherit two values from bounding box 510. In FIG. 5B, bounding box 522 inherits three values from bounding box 520. In FIG. 5C, bounding box 532 inherits four values from bounding box 520. In FIG. 5C, neither bounding box 542 nor bounding box 544 inherit any values from bounding box 540. It will be appreciated that, in some embodiments, the 2D model space can be expanded to a 3D model space, and that, in such embodiments, the bounding volumes in the child nodes may inherit between zero and six values from the bounding box of the parent node. The 2D cases described above are provided for illustrative purposes only and are not to be construed as limiting in any manner.

Similarly, FIGS. 5A through 5D provide examples using a binary-tree implementation of a BVH 400. In some embodiments, the BVH 400 can be expanded to implement a quad tree or an octree, as described above. In such cases, four or eight bounding boxes associated with the child nodes, respectively, may be enclosed by the bounding box for the parent node. The binary-tree implementation of the BVH 400 illustrated in FIGS. 5A through 5D is described for illustrative purposes and is not to be construed as limiting in any manner.

Figure 6A:
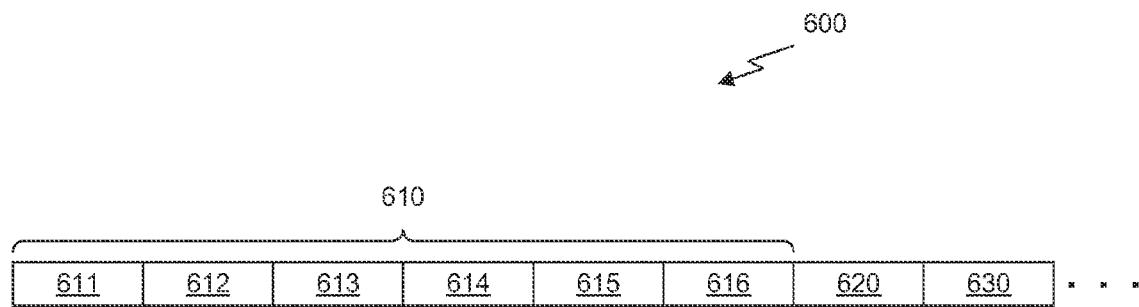
FIG. 6A illustrates a data structure for the encoded bounding volume hierarchy, in accordance with one embodiment.

FIG. 6A illustrates a data structure for an encoded BVH 600, in accordance with one embodiment. The tree data structure for the BVH 400 can be encoded to produce a compressed version of the BVH 400. The encoded BVH 600 comprises a plurality of data structures for a node arranged in a hierarchical manner that matches the tree structure of the BVH 400. The data structure for a node includes a plurality of fields including a first field 610 that includes values that represent the planes of a bounding volume associated with the node. In one embodiment, the plurality of values stored in the first field 610 includes up to six single-precision floating-point values that represent the planes of a bounding volume associated with the node. For example, the field 611 represents the minimum x-coordinate ($x_{min}$) for the bounding volume, the field 612 represents the maximum x-coordinate ($x_{max}$) for the bounding volume, the field 613 represents the minimum y-coordinate ($y_{min}$) for the bounding volume, the field 614 represents the maximum y-coordinate ($y_{max}$) for the bounding volume, the field 615 represents the minimum z-coordinate ($z_{min}$) for the bounding volume, and the field 616 represents the maximum z-coordinate ($z_{max}$) for the bounding volume. It will be appreciated that, for some nodes, one or more values may be inherited from a parent node. In such cases, the data structure for a node may reduce the number of values stored in the first field based on the number of values inherited from a parent node. For example, if a node inherits two values from a parent node, then the first field may only include four values for the four planes of the bounding volume that were not inherited from the parent node. The data structure for a node also includes a second field 620 (i.e., an inheritance field) that indicates whether the node inherits any values from the bounding volume of a parent node. The inheritance field 620 may include one bit for each plane of the bounding volume associated with the node. If the bit is set, then the bit indicates that the value for a corresponding plane may be inherited from the parent node. If the bit is not set, then the bit indicates that the value for a corresponding plane is stored in the first field 610. In one embodiment, the inheritance field 620 also includes one or more bits that indicate the type of node. For example, the inheritance field 620 may be eight bits (or one byte) wide and include 6 bits that indicate whether the node inherits any values from the parent node as well as two bits that indicate the type of node.

In addition, the data structure for a node may include a third field 630 (i.e., an offset field) that indicates an offset from the base address for the node to the location of the child nodes associated with the node. For example, following the data structure for the node, additional data structures for one or more other nodes may be included in the data structure for the encoded BVH 600. If the data structure for a node is associated with a root node of a quad tree, then four data structures associated with the child nodes of the root node may follow the data structure for the root node. The offset field 630 indicates the offset from the base address of the node to the base address of the first child node associated with the node. Because each node may inherit a different number of values from a parent node, the size of the data structure representing each node is variable. Thus, the offset field 630 provides an easy mechanism to quickly traverse the encoded BVH 600 without decoding each and every node within the encoded BVH 600. In alternative embodiments, the data structure for a node may include additional fields in lieu of or in addition to the fields described above in conjunction with FIG. 6A.

Figure 6B:
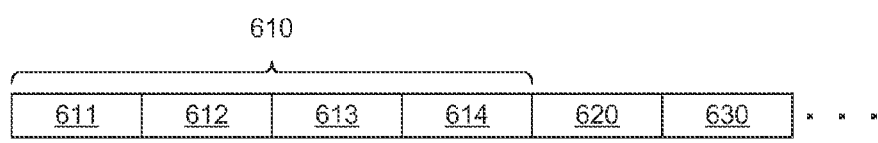
FIG. 6B illustrates a data structure for a node that inherits two values from a parent node, in accordance with one embodiment.

In one embodiment, the size of the data structure for a node may be adjusted based on the number of values for a bounding box associated with the node that are inherited from the bounding box of the parent node. The type of data structure implemented for the node may then be encoded in the inheritance field 620 (or an additional field) of the data structure for the node. FIG. 6B illustrates a data structure 600 for a node that inherits two values from a parent node, in accordance with one embodiment. As shown in FIG. 6B, if the node inherits two values from the parent node, then the first field 610 may include only four values (e.g., 611, 612, 613, and 614) that represent the four new values for the bounding box for the node. The inheritance field 620 indicates whether the values representing the planes of the bounding volume for the node are stored in the current node (e.g., in values 611, 612, 613, and 614) or stored in the parent node (as an inherited value). For example, if the first bit in the inheritance field 620 is 0, then the value for the minimum x-coordinate of the bounding volume is stored in the first value 611 of the first field 610. However, if the first bit in the inheritance field 620 is 1, then the value for the minimum x-coordinate of the bounding volume is inherited from the parent node (i.e., either stored in the first value 611 of the first field 610 of the parent node or inherited from the parent node of the parent node, and so forth). Similarly, if the second bit in the inheritance field 620 is 0, then the value for the maximum x-coordinate of the bounding volume is stored in either the second value 612 of the first field 610 (if the first bit in the inheritance field 620 was 0) or the first value 611 of the first field 610 (if the first bit in the inheritance field 620 was 1). If the second bit in the inheritance field 620 is 1, then the value for the maximum x-coordinate of the bounding volume is inherited from the parent node. The values for the minimum and maximum y-coordinates and z-coordinates for the bounding box are read from the remaining values (e.g., 611, 612, 613, or 614) of the first field 610 for the node or inherited from the parent node as indicated by the bits of the inheritance field 620.

As described above, the data structure for a node that inherits two values from the bounding volume of the parent node is smaller than the data structure for a node that stores all six values for the bounding volume of the node. Using two bits for encoding the node type in the inheritance field 620 enables each node within the BVH 400 to have a variable width. Using two bits, four different fixed-length nodes may be defined. For example, a first type of node may encode all six values for the bounding volume. A second type of node may encode four values for the bounding volume, a third type of node may encode three values for the bounding volume, and a fourth type of node may encode zero values for the bounding volume. In one embodiment, the inheritance field 620 may be located at the first byte at the base address for a node such that reading the first byte of the data structure for a node may indicate the length (in bytes) of the encoded node.

Figure 7A:
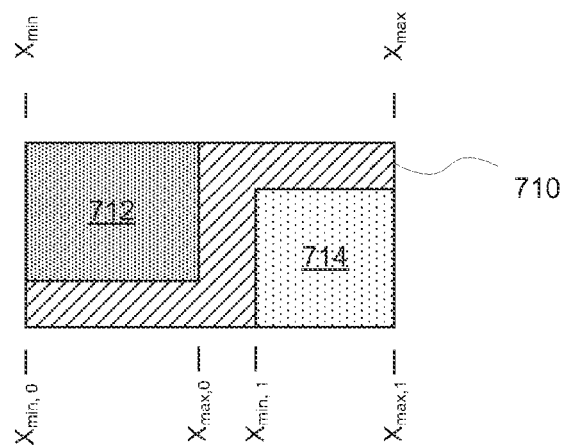
FIGS. 7A and 7B illustrate a technique for efficient compression of a bounding volume hierarchy, in accordance with one embodiment.
Figure 7B:
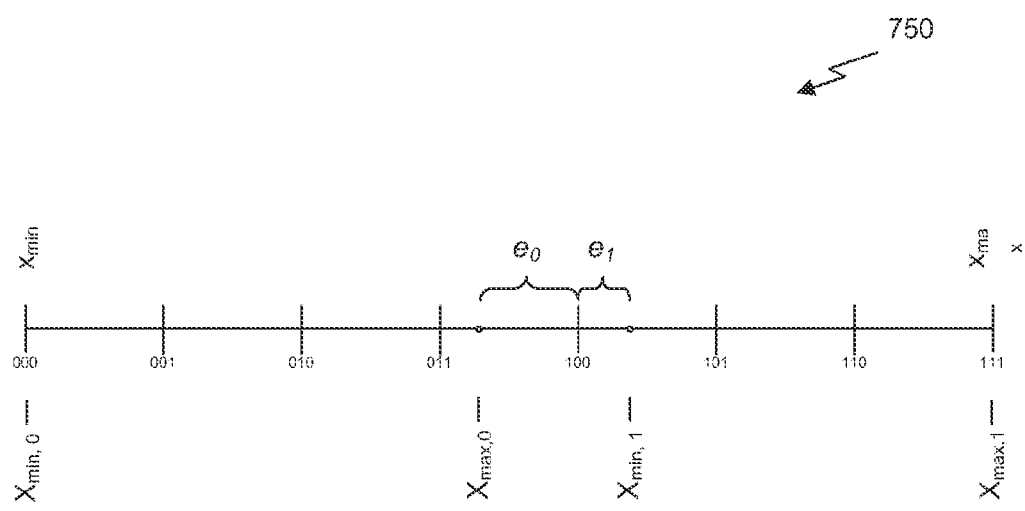

FIGS. 7A and 7B illustrate a technique for efficient compression of a BVH 400, in accordance with one embodiment. As described above, using the inheritance of values from the parent nodes may decrease the size of the encoded BVH 600 compared to conventional data structures by reducing the number of floating-point values included in each node. However, more efficient compression can be performed by using fewer bits to represent approximate values within the interval between a minimum coordinate and a maximum coordinate for the bounding volume of a parent node. It will be appreciated that a BVH 400 inherently has a hierarchy established between the nodes. For example, for any given axis for the bounding volume of a parent node, the minimum coordinate for the bounding volume of the parent node is always less than or equal to the minimum coordinate for the bounding volume of a child node. Similarly, the maximum coordinate for the bounding volume of the parent node is always greater than or equal to the maximum coordinate for the bounding volume of a child node. In other words, a bounding volume for a child node is always completely enclosed by a bounding volume for a parent node. This established hierarchy can be exploited to achieve more efficient compression of the BVH 400.

As shown in FIG. 7A, a bounding box 710 is associated with a parent node and encloses a first bounding box 712 associated with a first child node and a second bounding box 714 associated with a second child node. Again, although only two child nodes are associated with the parent node in FIG. 7A, corresponding to a binary-tree implementation of the BVH 400, in other embodiments, more than two child nodes may be associated with each parent node (e.g., in a quad-tree implementation of the BVH 400). It will be appreciated that the bounding box 710 for the parent node is associated with a left surface at $x=x_{min}$ and a right surface at $x=x_{max}$. Similarly, the bounding box 712 for the first child node is associated with a left surface at $x=x_{min,0}$ and a right surface at $x=x_{max,0}$, and the bounding box 714 for the second child node is associated with a left surface at $x=x_{min,1}$ and a right surface at $x=x_{max,1}$. It will be appreciated that the first child node inherits a value from the bounding box 710 such that $=x_{min}=x_{min,0}$ and that, similarly, the second child node inherits a value from the bounding box 710 such that $x_{max}=x_{max,1}$.

The BVH 400 may be compressed even beyond the use of inherited values by approximating the value for coordinates of the child bounding volumes. An interval between a minimum and maximum coordinate of the parent bounding box may be equally divided into a plurality of sub-intervals. A value at the extents of each sub-interval may be encoded using a lower number of bits than the number of bits used to encode the exact value. For example, the interval between $x_{min}$ and $x_{max}$ may be divided into seven intervals, and the values at the edges of the intervals may be encoded using a fewer number of bits than the number of bits used to represent single-precision floating-point values (i.e., 32 bits). Using seven intervals, each of the floating point values can be approximately encoded using 3 bits (i.e., eight codes representing eight different floating-point values on the interval between $x_{min}$ and $x_{max}$ inclusive).

As shown in FIG. 7B, a line graph 750 of the interval between $x_{min}$ and $x_{max}$ is equally divided into a number of intervals based on a number of bits chosen to use for encoding the values. Then, a particular code is selected to approximate a value within the interval. In one embodiment, each coordinate for the bounding volume associated with the selected axis is encoded based on whether the coordinate is associated with a plane of the bounding volume that represents a minimum coordinate or a maximum coordinate for the bounding volume. In other words, a maximum coordinate is encoded using the next higher encoded value within the interval and a minimum coordinate is encoded using the next lower encoded value within the interval. The result of using the next higher or next lower encoded value is to generate loosely fitting bounding volumes that approximate the bounding volumes specified in the BVH 400.

As shown in FIG. 7B, a minimum coordinate ($x_{min,0}$) for the bounding box 712 associated with the first child node is equal to $x_{min}$, which is encoded using the 3-bit value 0b000, and the maximum coordinate ($x_{max,0}$) for the bounding box 712 associated with the first child node is included within the fourth interval. Because $x_{max,0}$ is a maximum coordinate for the bounding box 712, the maximum coordinate is encoded using the code for the value at the upper end of the fourth interval, which is encoded using the 3-bit value 0b100. Similarly, a maximum coordinate ($x_{max,1}$) for the bounding box 714 associated with the second child node is equal to $x_{max}$, which is encoded using the 3-bit value and the minimum coordinate ($x_{min,1}$) for the bounding box 714 associated with the second child node is included within the fifth interval. Because $x_{min,1}$ is a minimum coordinate for the bounding box 714, the minimum coordinate is encoded using the code for the value at the lower end of the fifth interval, which is encoded using the 3-bit value 0b100.

For given floating-point values of $x_{min}$ and $x_{max}$, the encoded values associated with a particular code, c, is given by Equation 1, where n is the number of bits and c is the decimal value of the n-bit code.

$$f(c) = x_{min} + c\left(\frac{x_{min} - x_{max}}{2^n - 1}\right) \quad \text{(Eq. 1)}$$

So, for the example illustrated in FIGS. 7A and 7B, given a value of $x_{min}$ equal to 32.6 and a value for $x_{max}$ equal to 129.7, the encoded value corresponding to the code 0b100 is approximately equal to 88.1. Even though the original value for maximum x-coordinate of the bounding box 712 may have been something like 78.3, the value may be encoded as 88.1 using only 3 bits instead of the 32 necessary to encode the actual floating point number. Similarly, even though the original value for the minimum x-coordinate of the bounding box 714 may have been something like 94.2, the value may be encoded as 88.1 using only 3 bits instead of the 32 necessary to encode the actual floating point number. Given that, in ray-tracing algorithms, the BVH 400 is typically utilized to determine an approximation of whether a ray intersects with a particular graphics object, encoding the bounding volumes using a looser set of coordinates will typically not affect the results of the ray-tracing algorithm. Although the use of encoded bounding volumes in certain algorithms may indicate that a ray intersects the encoded bounding volume where the ray would not have intersected the original uncompressed bounding volume, this result typically only causes a small number of additional calculations. However, some of these additional calculations may be offset by the fact that results of intersection calculations performed for a parent node may be reused in cases where the bounding volume for a child node inherits a value from the bounding box of the parent node. Consequently, the reduction in memory requirements for the compressed BVH 400 and the increase in model complexity that is enabled typically outweighs any concerns over processing inefficiency added to the algorithm due to the approximations of the encoding technique.

In one embodiment, an algorithm for encoding the BVH 400 may encode each node using a different number of bits to ensure that the accuracy of the encoding is within some threshold, k. A constant, ε, may be chosen that represents an error threshold. The threshold k may be based on the value of the constant ε such as shown by Equation 2, where m is the level of the node in the BVH 400 and f(m) is a function that returns a factor based on the level of the node.

$$k(m)=f(m)*\epsilon \quad \text{(Eq. 2)}$$

In other words, a number of bits are chosen for encoding each node at a particular level of the BVH 400 such that the maximum error resulting from the encoding is below a threshold value k. As shown in FIG. 7B, the error for the maximum x-coordinate of the bounding box 712 is $e_0$ and the error for the minimum x-coordinate of the bounding box 714 is $e_1$. If the error is above the threshold k, then one or more additional bits may be used to encode the values for the node. For example, if ε is 3.4 and the value of f(m) for the first child node is 2, then additional bits may be used to encode the coordinates for the first child node if $e_0$ is greater than 6.8. Given the previous example using 78.3 and 88.1 for the maximum x-coordinate of the bounding box 712 and the encoded value, respectively, the error is approximately 9.8, which is greater than the threshold value k of 6.8. Therefore, in this example, additional bits may be used to encode the interval between $x_{min}$ and $x_{max}$. Using four bits instead of three bits generates fifteen intervals instead of only seven intervals, resulting in a potentially smaller error between a given value and a corresponding encoded value at the expense of a greater number of bits used to encode the node.

In one embodiment, the threshold k is larger for nodes closer to the base level of the BVH 400. In other words, the approximation should be tighter the closer the node is to a leaf node. A less accurate approximation may be appropriate at nodes closest to the root node because calculations involving the nodes are intended to be coarse in nature. For example, the root node may be associated with a bounding volume that encloses the entire model space. Each of four child nodes is associated with a bounding volume that encloses a different portion of the graphics objects within the model space. Therefore, calculations involving the bounding boxes of the child nodes of the root node are only intended to indicate whether a ray may intersect one or more of a large portion (e.g., $\frac{1}{4}^h$) of the graphics objects in the model and is not intended to identify whether a particular object is intersected by the ray. As the traversal of the BVH 400 continues and the child nodes are closer to the leaf nodes that represent the actual graphics objects, the bounding volume should represent approximately a minimum bounding volume such that calculations involving the encoded bounding volume approximate whether the ray actually intersects a particular graphics object.

In one embodiment, the number of bits used to encode each coordinate associated with the node is included in a field at the beginning of the node. In such embodiments, each node may be encoded with a variable number of bits for each value. In another embodiment, a number of bits selected for encoding is constant for every node within the BVH 400. Thus, a suitable number of bits for encoding is selected such that the error of every node within each level of the BVH 400 is less than a threshold k associated with that level. In yet another embodiment, the number of bits used to encode each coordinate for each node may be similar for particular groups of nodes. The groups of nodes may be defined at a boundary (e.g., a particular level of the BVH 400). For example, a special type of node may be encoded that specifies the number of bits used to encode coordinates for the group of nodes. Every subsequent node in the group is then encoded using the number of bits without specifying the number of bits in a field of each node. The same number of bits will be used until the next special type of node is encountered in the BVH 400 hierarchy, where the special types of nodes that include information about the number of bits defines a boundary between groups of nodes. In other words, additional compression can be achieved by not encoding information about the number of bits used to encode coordinates with each node as the information for one node may be reused for one or more subsequent nodes.

In one embodiment, the inheritance between nodes may be reset at a particular level of the encoded BVH 600. In other words, at a particular level of the encoded BVH 600, none of the nodes inherit any values from the bounding volumes of a parent node. Instead, each node will store all six values for the bounding volume associated with the node and the inheritance field will indicate that none of the values are inherited from the parent node. In particular, at such levels, the full floating point values for the coordinates of the bounding volumes for the nodes may be stored in the encoded BVH 600. Having particular levels of the encoded BVH 600 that aren't encoded ensures that the approximations based on the encoding, and thus the error involved in the encoded values, does not propagate fully from the root node down to each of the leaf nodes. In one embodiment, in addition to the base level of the root node, two additional levels of the encoded BVH 600 may be selected where nodes do not inherit any values from a parent node and where the nodes are not encoded using approximate values for the single-precision floating-point values.

Figure 8:
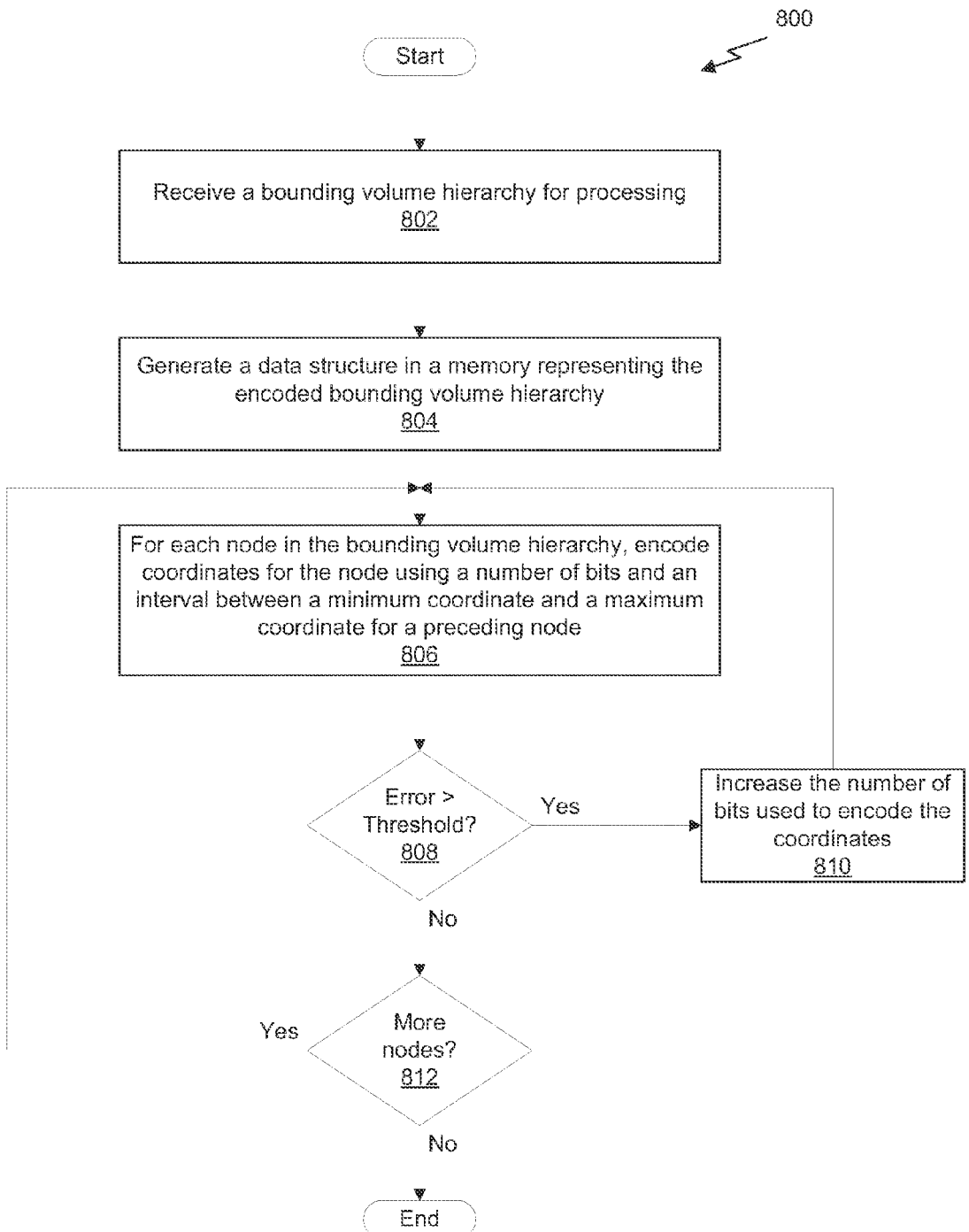
FIG. 8 illustrates a flowchart of a method for compressing a bounding volume hierarchy, in accordance with one embodiment.

FIG. 8 illustrates a flowchart 800 of a method for compressing a BVH 400, in accordance with one embodiment. At step 802, a processing unit (e.g., PPU 200) receives the BVH 400. At step 804, the processing unit generates a data structure in a memory (e.g., memory 204) that represents an encoded bounding volume hierarchy. At step 806, for each node in the BVH 400, the processing unit encodes coordinates for the node using a number of bits and an interval between a minimum coordinate and a maximum coordinate for a preceding node. The preceding node may be the immediate parent node for the node or a particular preceding node that is higher in the hierarchy that the node. In other words, the preceding node from which the interval is used to encode a particular node does not have to be the parent node of the node.

In one embodiment, the data structure for a node includes a plurality of fields including a first field that represents zero or more coordinates for a bounding volume associated with the node. For example, the first field may include one or more of a minimum x-coordinate, a maximum x-coordinate, a minimum y-coordinate, a maximum y-coordinate, a minimum z-coordinate, and a maximum z-coordinate. The coordinates are encoded using a number of bits. Each coordinate is encoded based on the comparison of the coordinate to a number of equally divided intervals between a minimum coordinate for a bounding volume of a parent node and a maximum coordinate for a bounding volume of the parent node. If the coordinate represents a minimum coordinate for the bounding volume of the node, then the coordinate is encoded based on a value at the lower end of a sub-interval corresponding to the coordinate. If the coordinate represents a maximum coordinate for the bounding volume of the node, then the coordinate is encoded based on a value at the upper end of a sub-interval corresponding to the coordinate. The plurality of fields may include a second field that indicates the inheritance characteristics of the node. The second field may also include one or more bits that indicate a type of the node. The plurality of fields may also include a third field that represents an offset from a base address for the node to a base address for one or more child nodes associated with the node.

At step 808, the processing unit determines whether the error for each encoded coordinate of the node is below a threshold value. If the error is above the threshold value, then, at step 810, the processing unit increases the number of bits used to encode the coordinates and the node is re-encoded at step 806. However, if the error is below the threshold value, then, at step 812, the processing unit adds the data structure for the node to the data structure for the encoded BVH 600 and determines whether the BVH 400 includes more nodes. If the BVH 400 includes more nodes, the method returns to step 806 where the next node is encoded and added to the data structure for the encoded BVH 600. Otherwise, the method terminates.

Figure 9:
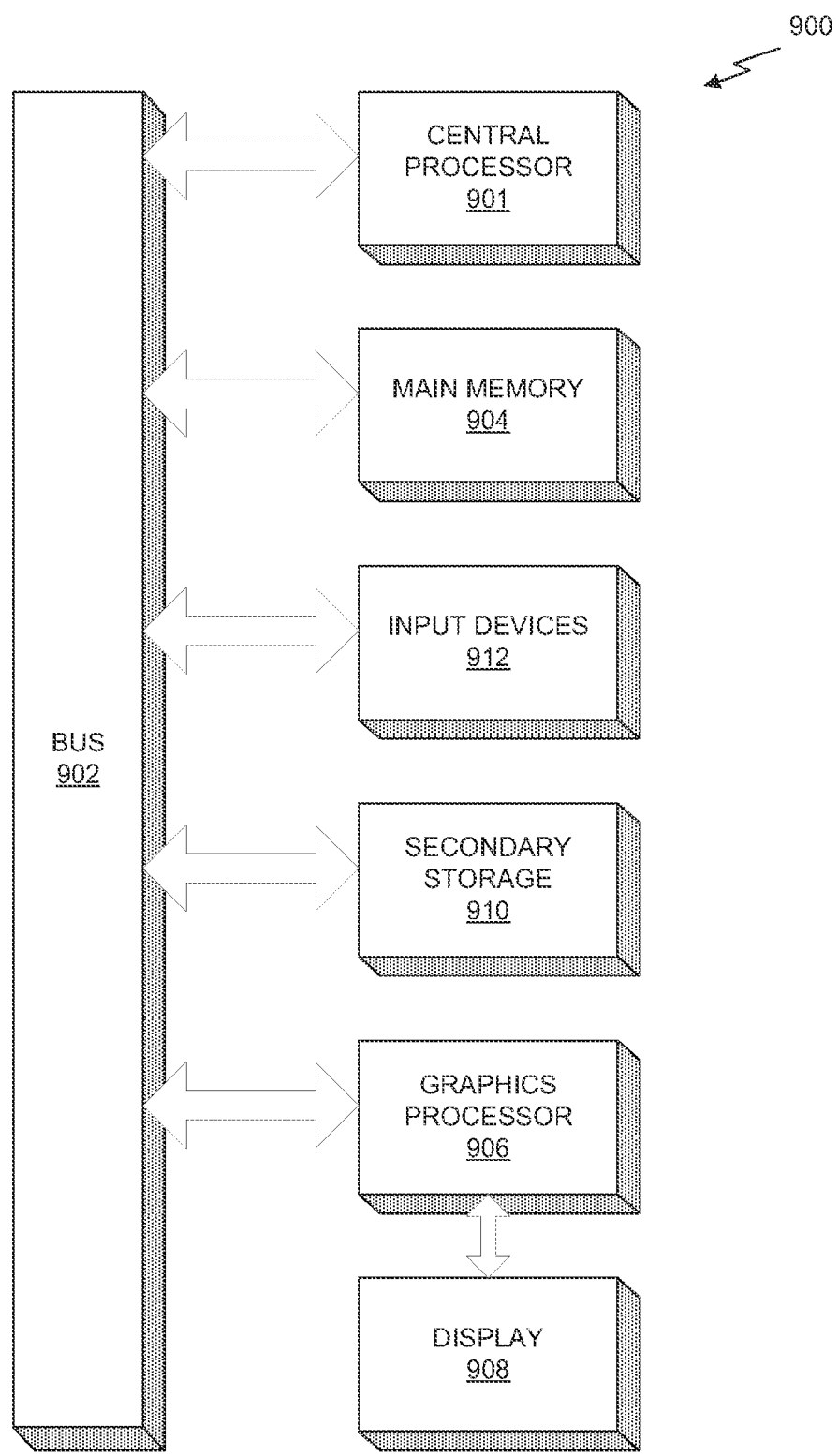
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express, AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, a graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU). In one embodiment, the BVH 400 may be encoded using either the processor 901 or the graphics processor 906.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage 910. Such computer programs, when executed, enable the system 900 to perform various functions. The memory 904, the storage 910, and/or any other storage are possible examples of computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving a bounding volume hierarchy comprising a plurality of nodes, wherein each node is associated with a bounding volume;
encoding the bounding volume hierarchy to generate an encoded bounding volume hierarchy stored in a memory; and
accessing, via a graphics processing unit, the encoded bounding volume hierarchy in the memory for performing one or more calculations associated with a rendering algorithm;
wherein each node in the encoded bounding volume hierarchy indicates whether the node inherits zero or more values from a parent node,
wherein encoding the bounding volume hierarchy comprises:
generating a data structure representing the encoded bounding volume hierarchy; and
for each node in the bounding volume hierarchy, storing a node data structure in the data structure, wherein the node data structure includes a first field that stores one or more values associated with the bounding volume for the node and a second field that indicates inheritance characteristics of the node,
wherein the one or more values are encoded based on an equally divided interval between a minimum coordinate of a bounding volume associated with the parent node and a maximum coordinate of the bounding volume associated with the parent node, and wherein the number of equally divided sub-intervals in the interval is based on a number of bits,
for each value in the one or more associated with the bounding volume for the node:
calculating an error for the value by taking the difference between the value and an encoded version of the value,
determining whether the error associated with encoding the value is above a threshold value, wherein the threshold value is calculated based on the level of the node in the bounding volume hierarchy; and
if the error is below the threshold value, then encoding the value using the number of bits, or
if the error is above the threshold value, then encoding the value using additional bits to generate smaller sub-intervals between the minimum coordinate and the maximum coordinate.

2. The method of claim 1, wherein the bounding volume hierarchy comprises a quad-tree.

3. The method of claim 1, wherein the bounding volume hierarchy comprises a binary tree.

4. The method of claim 1, wherein the second field comprises six bits, each bit of the six bits indicating whether a particular coordinate associated with the bounding volume of the node is inherited from the parent node.

5. The method of claim 4, wherein the second field further comprises one or more bits that indicate a type of node.

6. The method of claim 1, wherein the rendering algorithm is a ray-tracing algorithm.

7. A non-transitory computer-readable storage medium storing instructions that, when executed by a processor, cause the processor to perform steps comprising:
receiving a bounding volume hierarchy comprising a plurality of nodes, wherein each node is associated with a bounding volume;
encoding the bounding volume hierarchy to generate an encoded bounding volume hierarchy stored in a memory; and
accessing the encoded bounding volume hierarchy in the memory for performing one or more calculations associated with a rendering algorithm;
wherein each node in the encoded bounding volume hierarchy indicates whether the node inherits zero or more values from a parent node,
wherein encoding the bounding volume hierarchy comprises:
generating a data structure representing the encoded bounding volume hierarchy; and
for each node in the bounding volume hierarchy, storing a node data structure in the data structure, wherein the node data structure includes a first field that stores one or more values associated with the bounding volume for the node and a second field that indicates inheritance characteristics of the node,
wherein the one or more values are encoded based on an equally divided interval between a minimum coordinate of a bounding volume associated with the parent node and a maximum coordinate of the bounding volume associated with the parent node, and wherein the number of equally divided sub-intervals in the interval is based on a number of bits,
for each value in the one or more associated with the bounding volume for the node:
calculating an error for the value by taking the difference between the value and an encoded version of the value,
determining whether the error associated with encoding the value is above a threshold value, wherein the threshold value is calculated based on the level of the node in the bounding volume hierarchy; and
if the error is below the threshold value, then encoding the value using the number of bits, or
if the error is above the threshold value, then encoding the value using additional bits to generate smaller sub-intervals between the minimum coordinate and the maximum coordinate.

8. A system, comprising:
a memory storing a bounding volume hierarchy comprising a plurality of nodes, wherein each node is associated with a bounding volume; and
a processing unit configured to:
receive the bounding volume hierarchy,
encode the bounding volume hierarchy to generate an encoded bounding volume hierarchy stored in the memory, and
access the encoded bounding volume hierarchy in the memory for performing one or more calculations associated with a rendering algorithm,
wherein each node in the encoded bounding volume hierarchy indicates whether the node inherits zero or more values from a parent node,
wherein encoding the bounding volume hierarchy comprises:
generating a data structure representing the encoded bounding volume hierarchy; and
for each node in the bounding volume hierarchy, storing a node data structure in the data structure, wherein the node data structure includes a first field that stores one or more values associated with the bounding volume for the node and a second field that indicates inheritance characteristics of the node, wherein the one or more values are encoded based on an equally divided interval between a minimum coordinate of a bounding volume associated with the parent node and a maximum coordinate of the bounding volume associated with the parent node, and wherein the number of equally divided sub-intervals in the interval is based on a number of bits, for each value in the one or more values associated with the bounding volume for the node:
- calculating an error for the value by taking the difference between the value and an encoded version of the value,
- determining whether the error associated with encoding the value is above a threshold value, wherein the threshold value is calculated based on the level of the node in the bounding volume hierarchy; and
- if the error is below the threshold value, then encoding the value using the number of bits, or
- if the error is above the threshold value, then encoding the value using additional bits to generate smaller sub-intervals between the minimum coordinate and the maximum coordinate.

9. The system of claim 8, wherein the processing unit is a graphics processing unit.

* * * * *